US010565839B1

(12) United States Patent
Tobias (10) Patent No.: US 10,565,839 B1
(45) Date of Patent: Feb. 18, 2020

(54) SECURITY MEDALLION

(71) Applicant: Marc W. Tobias, Sioux Falls, SD (US)

(72) Inventor: Marc W. Tobias, Sioux Falls, SD (US)

( * ) Notice: Subject to any disclaimer, the term of this patent is extended or adjusted under 35 U.S.C. 154(b) by 0 days.

(21) Appl. No.: 15/730,210

(22) Filed: Oct. 11, 2017

Related U.S. Application Data (60) Provisional application No. 62/411,848, filed on Oct. 24, 2016.

(51) Int. Cl.
| | | |
|---|---|---|
| *G08B 13/14* | (2006.01) | |
| *G09F 3/03* | (2006.01) | |
| *G06F 21/87* | (2013.01) | |
| *G06F 1/24* | (2006.01) | |
| *G01S 19/16* | (2010.01) | |
| *G09F 3/02* | (2006.01) | |
| *G09F 3/00* | (2006.01) | |
| *G06F 16/16* | (2019.01) | |

(52) U.S. Cl.
CPC ........... *G08B 13/1427* (2013.01); *G06F 1/24* (2013.01); *G06F 21/87* (2013.01); *G09F 3/0335* (2013.01); *G09F 3/0352* (2013.01); *G01S 19/16* (2013.01); *G06F 16/162* (2019.01); *G09F 3/0291* (2013.01); *G09F 2003/023* (2013.01)

(58) Field of Classification Search
CPC .......... G06K 9/00449; G06K 9/00442; H04W 64/00; H04W 84/18; H04W 8/22; H04W 8/245; H04W 92/00; Y02D 70/00; Y02D 70/142; Y02D 70/144; Y02D 70/164; Y02D 70/166; Y02D 70/22; Y02D 70/26

USPC ... 340/572.1, 573.1, 573.3, 568.1, 552, 555, 340/568.8, 568.5, 568.6, 568.3, 568.4, 340/571, 691.6, 692

See application file for complete search history.

(56) References Cited

U.S. PATENT DOCUMENTS

| | | | | |
|---|---|---|---|---|
| 5,381,685 | A * | 1/1995 | Carl | E05B 73/0005 |
| | | | | 248/553 |
| 5,667,187 | A * | 9/1997 | Doman | E05B 73/0082 |
| | | | | 248/551 |
| 6,305,656 | B1 * | 10/2001 | Wemyss | A47G 23/0216 |
| | | | | 206/5 |
| 2007/0229962 | A1 * | 10/2007 | Mason, Jr. | C11D 17/049 |
| | | | | 359/609 |
| 2013/0316114 | A1 * | 11/2013 | Hwang | B32B 7/12 |
| | | | | 428/41.7 |
| 2015/0242895 | A1 * | 8/2015 | Brown | G06Q 30/0257 |
| | | | | 705/14.55 |
| 2016/0343224 | A1 * | 11/2016 | Markwell | G08B 13/2462 |
| 2016/0378140 | A1 * | 12/2016 | Bergmann | B32B 7/12 |
| | | | | 361/679.26 |

(Continued)

*Primary Examiner* — Daniel Previl
(74) *Attorney, Agent, or Firm* — Jeffrey A. Proehl; Woods, Fuller, Shultz & Smith, PC (57) ABSTRACT

A security medallion for a portable object may include a housing and a mechanical interface formed in the housing that may be configured to receive a laptop lock. The security medallion may also include a circuit board positioned within the housing that may be operable to provide electronic monitoring of the security medallion. The security medallion may further include a power source positioned within the housing and coupled to the circuit board, and an attachment member supported on the housing and having an adhesive configured to selectively bond to the portable object. The adhesive may be releasable from the portable object by application of a release means.

19 Claims, 7 Drawing Sheets

(56) References Cited

U.S. PATENT DOCUMENTS

2017/0312578 A1* 11/2017 Tran ................... A63B 24/0075

* cited by examiner

Fig. 18

SECURITY MEDALLION

BACKGROUND

The present invention relates to a security medallion for portable objects, such as portable electronic devices.

SUMMARY

In one embodiment, the invention provides a security medallion for a portable object. The security medallion includes a housing and a mechanical interface formed in the housing. The mechanical interface is configured to receive a laptop lock. The security medallion also includes a circuit board positioned within the housing. The circuit board is operable to provide electronic monitoring of the security medallion. The security medallion further includes a power source positioned within the housing and coupled to the circuit board, and an attachment member supported on the housing and having an adhesive configured to selectively bond to the portable object. The adhesive being releasable from the portable object by application of a release means.

In some embodiments, the adhesive is releasable from the portable object electrically or electronically, through introduction of light at specific frequencies, through introduction of audio energy or sound at specific frequencies, and/or through introduction and release of micro bubbles.

In some embodiments, the release means includes a magnetic field, an electrical field, or a radio frequency energy field.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a security medallion 20 embodying the invention. The security medallion 20 is configured to attach to a portable object 24 (FIG. 19), such as a portable electronic device. In some embodiments, the portable object 24 may be, for example, a laptop or notebook computer, a tablet computer, a smartphone, a thin client, an eReader, an MP3 player, a USB hub, a chip and pin machine, or the like. The security medallion 20 is a relatively small, self-contained unit that provides both physical security and electronic security to the potable object 24. The illustrated security medallion 20 is round, but may alternatively be square, hexagonal, or any other desired shape. The security medallion 20 may also act as a label that provides product information or ownership information associated with the portable object 24. For example, a company or government agency logo can be incorporated into the medallion 20 (e.g., by laser etching, 3D printing, casting, molding, etc.) to clearly identify in a permanent nature the object being protected and its owner.

The illustrated security medallion 20 includes a housing 28, a slot 32, a circuit board 36, a power source 40, and an attachment member 44. In the illustrated embodiment, the housing 28 is generally cylindrical, but may alternatively be other shapes or configurations. The housing 28 is made of plastic or metal. In some embodiments, the housing 28 may have a diameter of about 3 to 4 inches, and may have a thickness of about 0.25 inches. In other embodiments, the housing 28 may have different diameters and/or thicknesses, depending on the components included within the housing 28. The illustrated housing 28 includes a cover 48 containing a logo, badge, or other identifying indicia of the owner or business associated with the security medallion 20. The cover 48 can be customized with different colors, words, logos, and the like for different users. In some embodiments, the cover 48 is made of metal to also function as an antenna for the security medallion 20.

Figure 19:
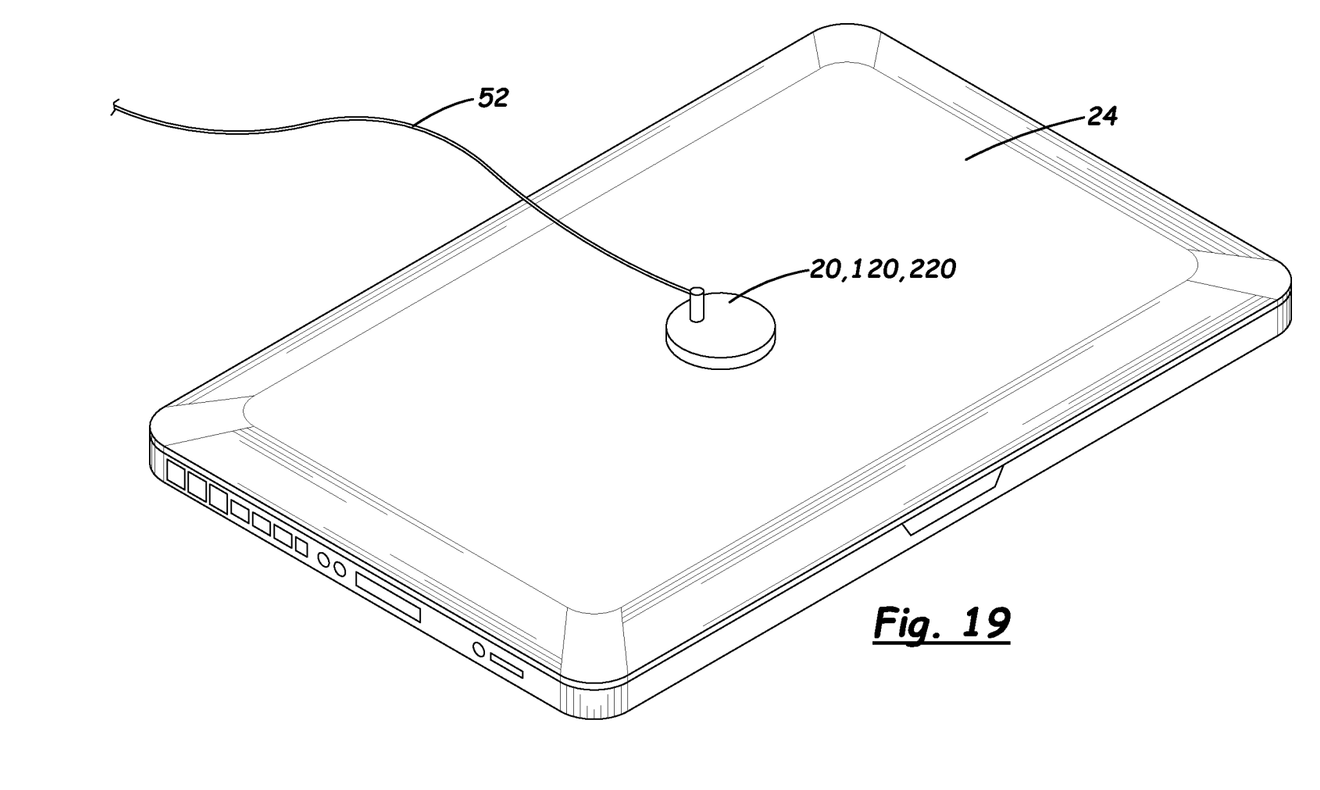
FIG. 19 illustrates a security medallion attached to a portable object and secured with a laptop cable lock.

The slot 32 is formed in the housing 28. In particular, the slot 32 is formed in the cover 48 of the housing 28, but may alternatively be formed elsewhere on the housing 28. As shown in FIG. 19, the slot 32 is part of a mechanical interface configured to receive a physical lock 52, such as the laptop cable lock disclosed in U.S. Pat. No. 5,381,685. The cable lock could have a T-bar or scissor mechanism. The physical lock 52 secures the security medallion 20 (and, thereby, the attached portable object 24) to an immovable object, such as a desk, table, chair, or the like. The security medallion 20 thereby provides a security slot for a conventional cable lock on any type of device or object, particularly newer, slim portable electronic devices that do not contain a similar type of slot or security interface.

Referring back to FIGS. 2 and 4, the circuit board 36 is positioned within the housing 28. In some embodiments, the circuit board 36 is a printed circuit board (PCB) including a processor and a memory. The circuit board 36 includes electronics that are operable to provide electronic security for the portable object 24. For example, the circuit board 36 may include one or more of the following components: (i) an RFID tag for monitoring and maintaining inventory records and/or security clearance/level authorizations; (ii) a transceiver (e.g., low energy Bluetooth®) for transmitting authentication information, alarm information, and/or monitoring information to a remote device (e.g., a user's smartphone, a server, etc.); (iii) a wireless chipset (e.g., WiFi, near-field communications, etc.) to provide alarm notifications when the security medallion 20 is moved, altered, or accessed improperly; (iv) an accelerometer for detecting and reporting movement of the security medallion 20; (v) a GPS chipset to determine the location of the security medallion 20; and (vi) an active RF tag to track movements of the security medallion 20 within a facility. In some embodiments, the circuit board 36 may also electrically couple to the portable object 24. In such embodiments, the circuit board 36 may, when triggered by an event (e.g., unauthorized movement, a command from a remote device, etc.), selectively erase critical data from the portable object 24. In addition, the security medallion 20 could track the location of the portable object 24 via the Internet and the portable object's IP address.

The power source 40 is also positioned within the housing 28 and is coupled to the circuit board 36. The power source 40 provides power to the electronics of the security medallion 20. In some embodiments, the power source 40 may include one or more rechargeable batteries, such as Li-ion batteries. A charging port (e.g., a micro-USB port) may be supported by the housing 28 and coupled to the circuit board 36 to recharge the power source 40. Alternatively, the power source 40 may be recharged wirelessly (e.g., by induction charging). In some embodiments, the security medallion 20 may include LEDs (or other types of displays) coupled to the power source 40 and supported on the housing 28 to indicate statuses associated with the security medallion 20 (e.g., armed, low battery, charging, security violations, etc.).

The attachment member 44 is supported by the housing 28. Together with the housing 28, the attachment member 44 encloses the circuit board 36 and the power source 40. The attachment member 44 is configured to selectively secure the security medallion 20 to the portable object 24 (FIG. 19). The attachment member 44 is also removable from the portable object 24 without damaging or marring the portable object 24. In some embodiments, the attachment member 44 includes an adhesive 56 that bonds to an outer surface of the portable object 24. The adhesive 56 affixes the security medallion 20 to the portable object 24 quickly, but cannot be removed easily or rapidly. As such, the security medallion 20 provides security to the portable object 24 by ensuring that the medallion 20 (and the physical lock 52, if present) remains an integral part of the portable object 24 until the adhesive 56 is released by an authorized user.

Figure 18:
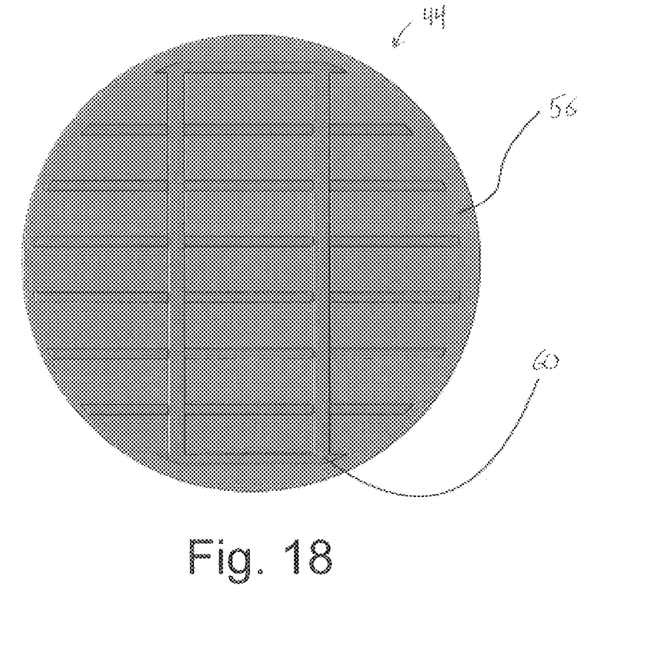
FIG. 18 illustrates an attachment member for use with a security medallion.

In the illustrated embodiment, the adhesive 56 is releasable from the portable object 24 by introducing an electrical current into the adhesive 56. As shown in FIG. 18, a grid of wires 60 extends through the attachment member 44 and, more particularly, the adhesive 56. The grid of wires 60 is electrically coupled to the power source 40. Introducing an electrical current at a specific magnitude and/or frequency into the grid of wires 60 causes the adhesive 56 to heat to a specific temperature, thereby releasing the adhesive 56.

In other embodiments, the adhesive 56 is releasable from the portable object 24 electrically, electronically, through introduction of light at specific frequencies, through introduction of audio energy or sound at specific frequencies, through introduction of micro bubbles, through introduction of a chemical, and/or through introduction of radio waves, microwaves, ultrasound waves, or infrared waves. In further embodiments, the adhesive 56 is releasable using a magnetic field, an electrical field, or a radio frequency energy field.

In some embodiments, the power source 40 may provide the electrical current to the attachment member 44 in response to a code or a signal. For example, the security medallion 20 may include a security feature (e.g., a keypad, a lock cylinder, a biometric reader, etc.) on the housing 28. When the security feature is activated, the security feature may signal the circuit board 36 to activate the power source 40 and release the attachment member 44 from the portable object 24. Additionally or alternatively, the circuit board 36 may receive a wireless signal from a fob, a smartphone, or other device to activate the power source 40 and supply electrical current to the grid of wires 60, releasing the attachment member 44 from the portable object 24. If the attachment member 44 is removed from the portable object 24 without the proper code or signal, the security medallion 20 may trigger a remote or local alarm, and/or the portable object 24 may be damaged.

The security medallion 20 is designed to involve a delay before removing the adhesive 56 from the portable object 24. Unless the adhesive 56 is released in a predetermined manner, there may be extensive damage to the portable object 24, or the security medallion 20 may simply not be removable. The methods of authorized removal of the security medallion 20 may rely on a variety of inputs, including temperature increase or decrease, electrical signal, electronic signal, radio frequency energy, sound, light, infrared, ultraviolet, or other code or means as an input to make removal relatively easy and timely without damage or trace to the portable object 24.

FIGS. 5-8 illustrate another security medallion 120 embodying the invention. The illustrated security medallion 120 is similar to the security medallion 20 shown in FIGS. 1-4, and includes a housing 128, a slot 132, a circuit board 136, a power source 140, and an attachment member 144. In the illustrated embodiment, the housing 128 includes an outer ring 148 in addition to a cover 152. The outer ring 148 is rotatable 360 degrees relative to the cover 152. The slot 132 is formed in the outer ring 148 to connect the physical lock 52 (FIG. 19) to a perimeter of the security medallion 120. The slot 132 and, thereby, the physical lock 52 can be adjusted to any position relative to the portable object 24 by rotating the outer ring 148.

FIGS. 9-16 illustrate yet another security medallion 220 embodying the invention. In the illustrated embodiment, the security medallion 220 is a two-piece medallion, including a dock 224 (FIGS. 9-11) and a body 228 (FIGS. 12-13) that attaches to the dock 224. The two-piece arrangement allows the body 228 to be removed from and reattached to the portable object 24 (FIG. 19) without also having to remove the dock 224. The dock 224 can be permanently or releasably secured to the portable object 24.

Figure 1:
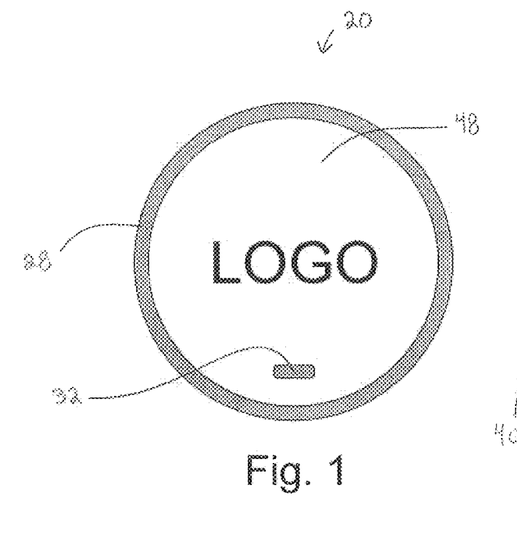
FIG. 1 is a top view of a security medallion embodying the invention.
Figure 2:
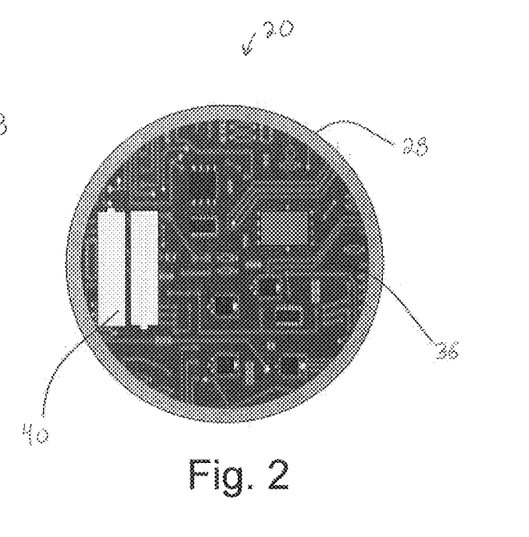
FIG. 2 is a top view of the security medallion of FIG. 1 with a cover removed.
Figure 3:
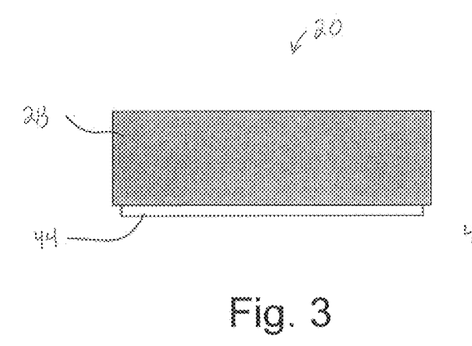
FIG. 3 is a side view of the security medallion of FIG. 1.
Figure 4:
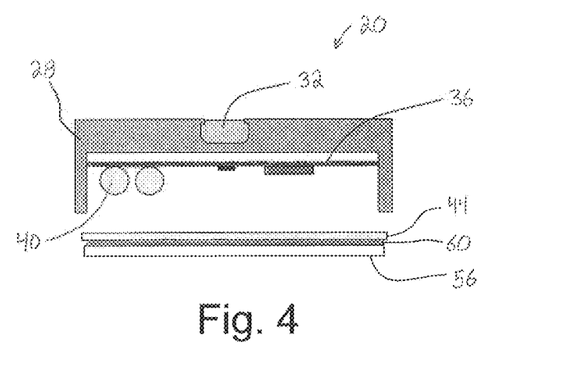
FIG. 4 is an exploded, cross-sectional view of the security medallion of FIG. 1.
Figure 5:
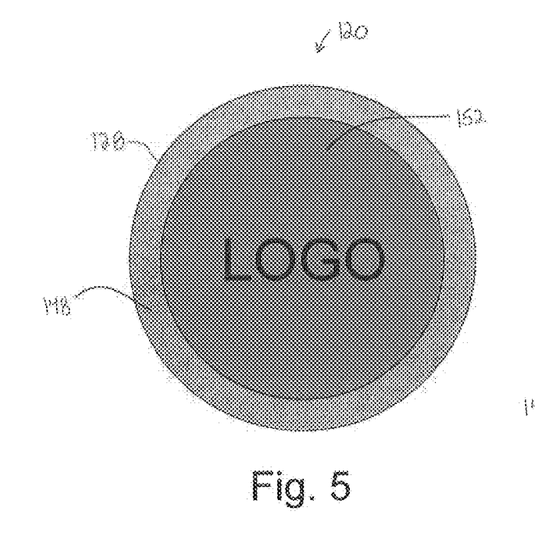
FIG. 5 is a top view of another security medallion embodying the invention.
Figure 6:
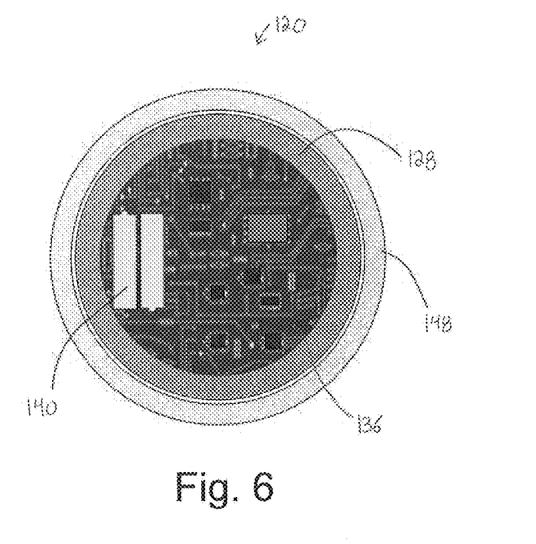
FIG. 6 is a top view of the security medallion of FIG. 5 with a cover removed.
Figure 7:
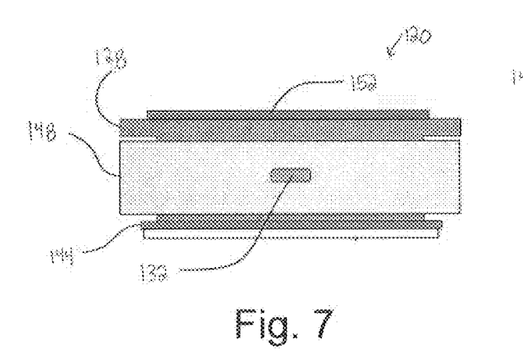
FIG. 7 is a side view of the security medallion of FIG. 5.
Figure 8:
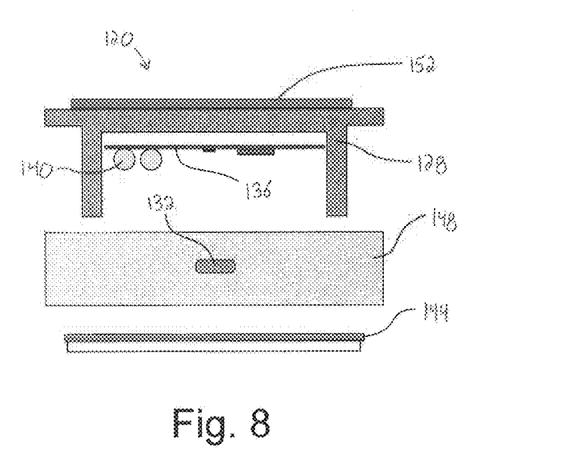
FIG. 8 is an exploded side view of the security medallion of FIG. 5.
Figure 9:
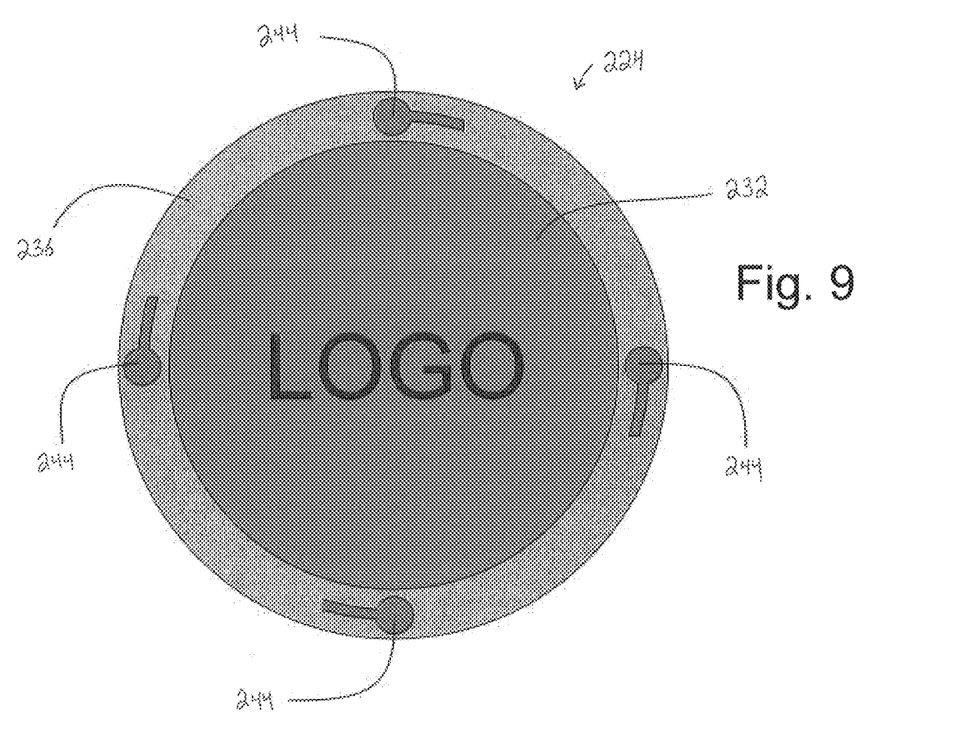
FIG. 9 is a top view of a security medallion dock embodying the invention.
Figure 10:
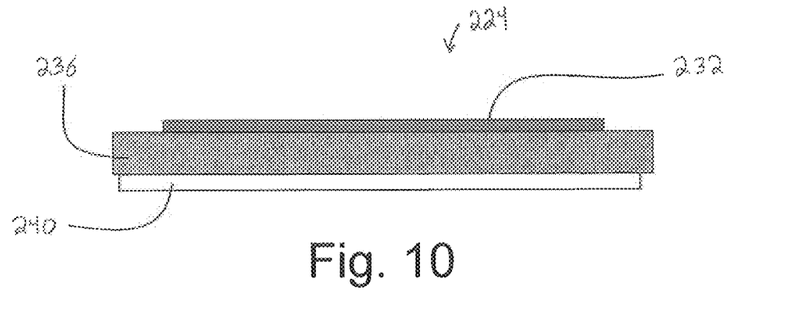
FIG. 10 is a side view of the security medallion dock of FIG. 9.
Figure 11:
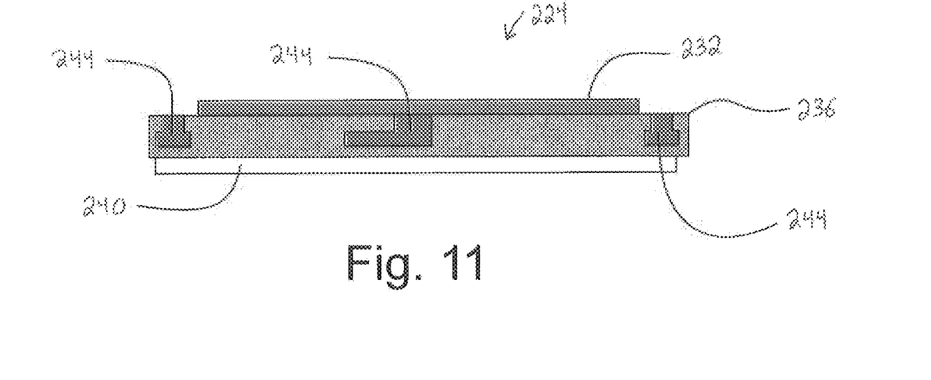
FIG. 11 is a side, partial cross-sectional view of the security medallion dock of FIG. 9.

As shown in FIGS. 9-11, the illustrated dock 224, or mount, includes a plate 232, an outer ring 236, and an attachment member 240. The plate 232 contains a logo, badge, or other identifying indicia of the owner or business associated with the security medallion 220. The outer ring 236 surrounds a perimeter of the plate 232 and defines a plurality of slots 244. In the illustrated embodiment, the outer ring 236 includes four slots 244 that are evenly spaced around the ring 236, and the slots 244 are generally keyhole-shaped. In other embodiments, the outer ring 236 may include fewer or more slots 244. The attachment member 240 is supported underneath the plate 232. The attachment member 240 may be similar to the attachment member 44 discussed above with respect to FIGS. 1-4. Alternatively, the attachment member 240 may include an adhesive or other mechanism that permanently (i.e., non-removably) attaches the dock 224 to the portable object 24.

Figure 12:
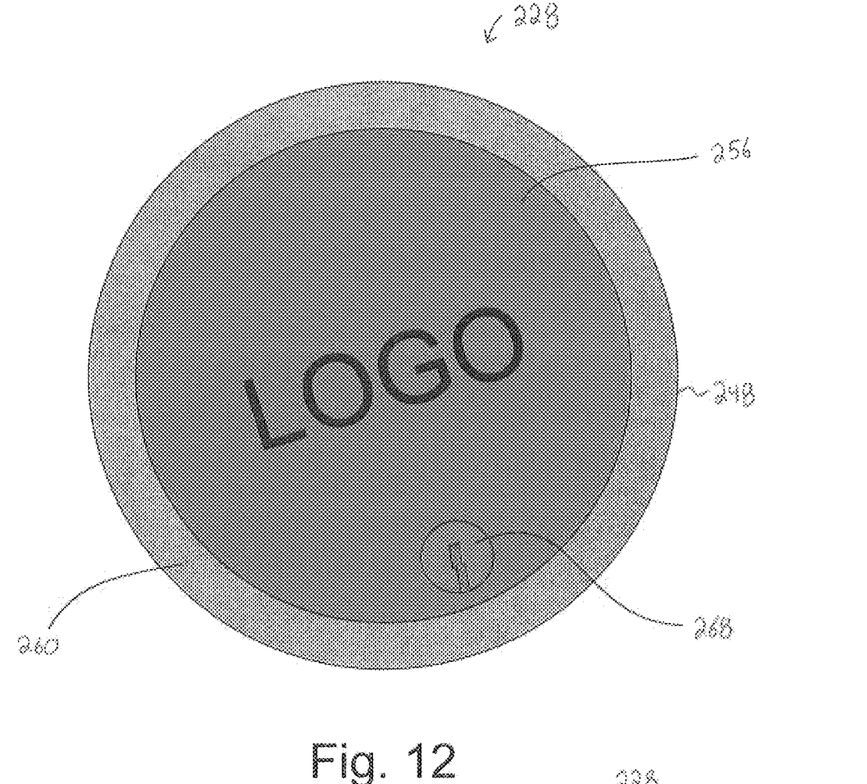
FIG. 12 is a top view of a security medallion body that interfaces with the security medallion dock shown in FIG. 9.
Figure 13:
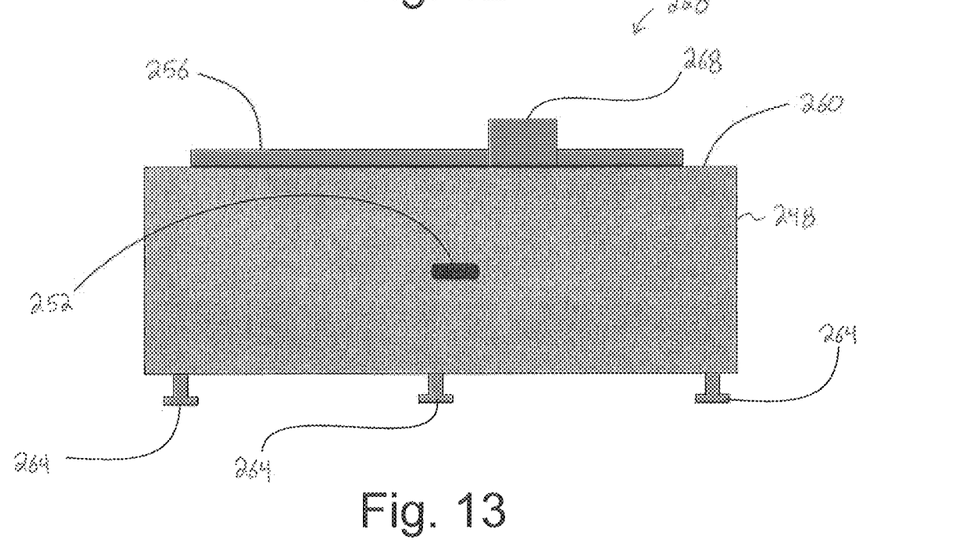
FIG. 13 is a side view of the security medallion body of FIG. 12.

As shown in FIGS. 12-13, the body 228 includes a housing 248 and a slot 252 formed on the housing 248. The housing 248 includes a cover 256 and an outer ring 260. The cover 256 contains a logo, badge, or other identifying indicia of the owner or business associated with the security medallion 220. The outer ring 260 surrounds a perimeter of the cover 256. The outer ring 260 is rotatable 360 degrees relative to the cover 256. The slot 252 is formed in the outer ring 260 and is configured to receive the physical lock 52 (FIG. 19). The slot 252, and thereby the physical lock 52, can be adjusted to any position relative to the portable object 24 by rotating the outer ring 260.

Although not shown, the body 228 also includes a circuit board and a power source positioned within the housing 248, similar to the circuit board 36 and the power source 40 discussed above with respect to FIGS. 1-4.

The illustrated body 228 further includes a plurality of posts 264 and a lock mechanism 268. The posts 264 are receivable in the slots 244 (FIG. 9) of the dock 224 to connect the body 228 to the dock 224. In the illustrated embodiment, the body 228 includes four posts 264 extending downwardly from the body 228. In other embodiments, the body 228 may include fewer or more posts 264, matching the number of slots 244 in the dock 224. The lock mechanism 268 is supported by the housing 248. The lock mechanism 268 is operable to selectively inhibit movement of the body 228 relative to the dock 224, as further explained below. In the illustrated embodiment, the lock mechanism 268 is actuatable by a key. In other embodiments, the lock mechanism 268 may be actuated by a combination, a code, a wireless signal, or the like.

Figure 14:
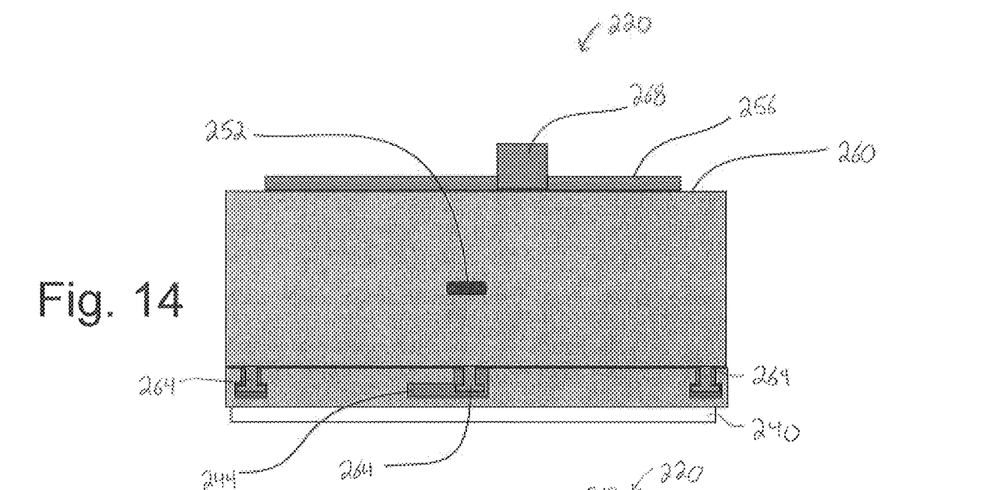
FIGS. 14-16 are side, partial cross-sectional views of the security medallion body of FIG. 12 connecting to the security medallion dock of FIG. 9.
Figure 15:
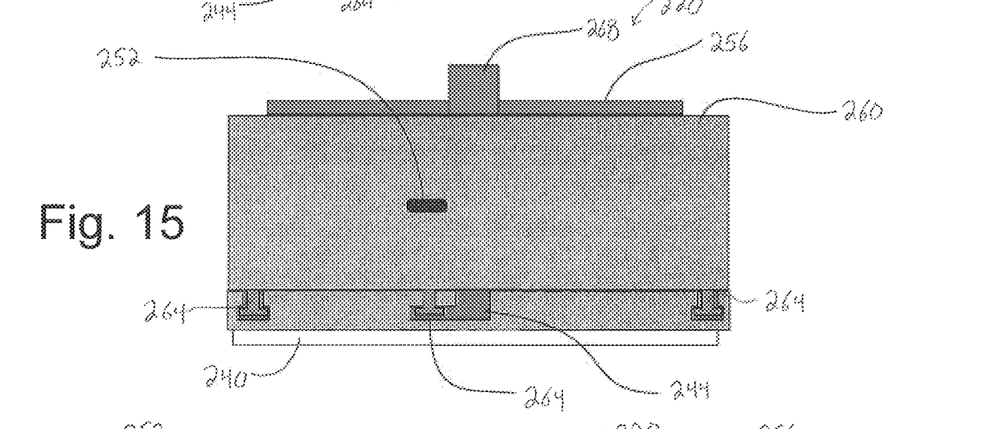
Figure 16:
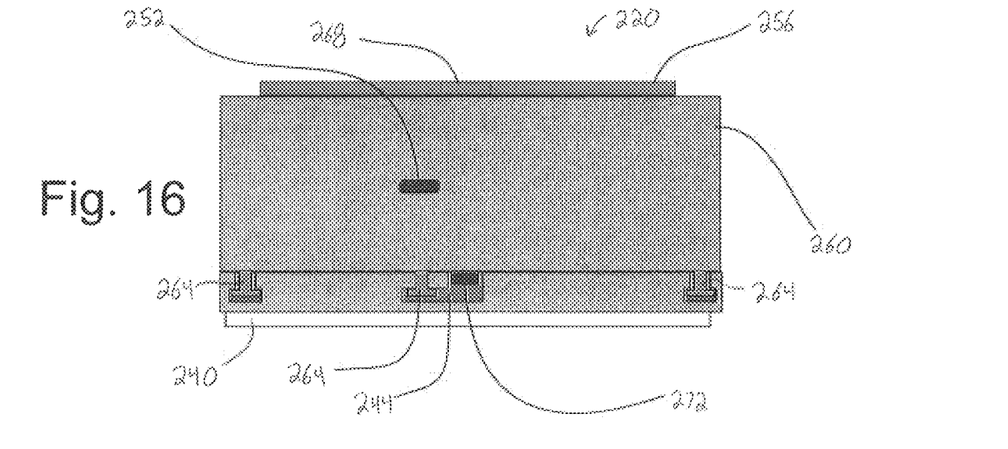
Figure 17:
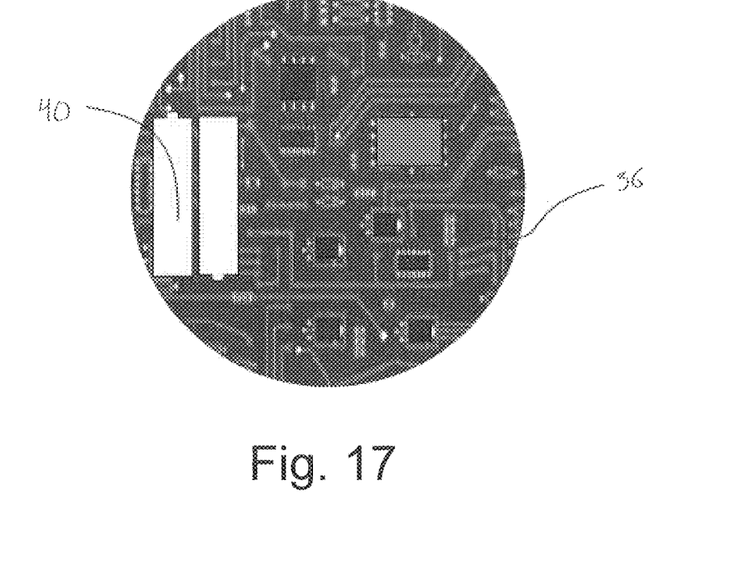
FIG. 17 illustrates a printed circuit board for use with a security medallion.

FIGS. 14-16 illustrate the body 228 being attached to the dock 224. In FIG. 14, the posts 264 of the body 228 are inserted into the slots 244 of the dock 224. In this position, the body 228 and the dock 224 are aligned, but not secured together. In FIG. 15, the body 228 is rotated relative to the dock 224 so that the posts 264 slide to narrow sections of the slots 244 (similar to a bayonet-style connection). In this position, the body 228 is secured relative to the dock 224 (i.e., the body 228 cannot be pulled axially away from the dock 224), but is not locked to the dock 224. In FIG. 16, the lock mechanism 268 is actuated to inhibit movement (e.g., rotation) of the body 228 relative to the dock 224. In particular, the lock mechanism 268 is actuated so a projection 272 extends from the housing 248 of the body 228 into one of the slots 244. The projection 272 fills space within the slot 244, inhibiting the body 228 from being rotated back to the position shown in FIG. 14. In the position of FIG. 16, the body 228 is locked to the dock 224.

What is claimed is:

1. A security medallion for use with a portable object, the security medallion comprising:
    a housing defining an interior and an exterior, the housing having a slot formed in the exterior to provide the housing with a mechanical interface integrally formed in the housing, the slot being configured to receive a portion of a lock;
    communications circuitry positioned in the interior of the housing, the communications circuitry being configured to wirelessly emanate electronic signals from the security medallion;
    a power source being positioned in the interior of the housing, the power source being coupled to the communications circuitry to operate the circuitry; and
    an attachment member mounted on the housing, the attachment member having a first face positioned toward the interior of the housing and a second face opposite of the first face and oriented outwardly with respect to the interior of the housing;
    an adhesive positioned on the attachment member and being configured to selectively bond the attachment member to the portable object to secure the housing and elements in the interior of the housing to the portable object;
    wherein the adhesive is releasable from the portable object to release the attachment member and the housing from the object by application of a release means applied to the adhesive.

2. The security medallion of claim 1, wherein the adhesive is releasable from the portable object electrically or electronically.

3. The security medallion of claim 2, wherein the attachment member includes a grid of wires that receives electrical current to heat the adhesive.

4. The security medallion of claim 2, wherein the adhesive is releasable by introduction of an electric current at specific frequencies.

5. The security medallion of claim 1, wherein the adhesive is releasable from the portable object through introduction of light at specific frequencies.

6. The security medallion of claim 1, wherein the adhesive is releasable from the portable objet through introduction of audio energy or sound at specific frequencies.

7. The security medallion of claim 1, wherein the adhesive is releasable from the portable object through introduction and release of micro bubbles.

8. The security medallion of claim 1, wherein the release means includes a magnetic field, an electrical field, or a radio frequency energy field.

9. The security medallion of claim 1, wherein the adhesive is releasable from the portable object through introduction of a chemical.

10. The security medallion of claim 1, wherein the adhesive is releasable from the portable object through introduction of radio waves, microwaves, ultrasound waves, or infrared waves.

11. The security medallion of claim 1, wherein the communications circuitry includes an RFID tag.

12. The security medallion of claim 1, wherein the communications circuitry includes a wireless transceiver operable to transmit an alert to a remote device.

13. The security medallion of claim 1, wherein the communications circuitry includes an accelerometer to detect movement of the security medallion.

14. The security medallion of claim 1, wherein the communications circuitry includes a GPS chipset.

15. The security medallion of claim 1, wherein the communications circuitry is configured to electrically couple to the portable object, and wherein the circuit board is operable to selectively erase data on the portable object in response to an event.

16. The security medallion of claim 1, wherein the slot of the mechanical interface is configured to attach to a physical cable lock having a T-bar or scissor mechanism.

17. The security medallion of claim 1, wherein the adhesive forms the sole attachment of the attachment member and the housing to the portable object.

18. The security medallion of claim 1, wherein the housing and attachment member form a self-contained unit containing the mechanical interface, the circuit board, and the power source.

19. The security medallion of claim 1, wherein the attachment member does not penetrate an exterior of the portable object to selectively bond to the portable object.

* * * * *